United States Patent
Seki et al.

(10) Patent No.: US 12,365,218 B2
(45) Date of Patent: Jul. 22, 2025

(54) HEATER DEVICE

(71) Applicant: DENSO CORPORATION, Kariya (JP)

(72) Inventors: Hideki Seki, Kariya (JP); Yusuke Tanaka, Kariya (JP); Kimitake Ishikawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 892 days.

(21) Appl. No.: 17/481,691

(22) Filed: Sep. 22, 2021

(65) Prior Publication Data

US 2022/0001720 A1    Jan. 6, 2022

Related U.S. Application Data

(63) Continuation of application No. PCT/JP2020/010843, filed on Mar. 12, 2020.

(30) Foreign Application Priority Data

Mar. 26, 2019   (JP) .................................. 2019-058595

(51) Int. Cl.
*B60H 1/00*   (2006.01)
*B60H 1/22*   (2006.01)
*H05B 3/03*   (2006.01)

(52) U.S. Cl.
CPC ....... *B60H 1/00742* (2013.01); *B60H 1/2218* (2013.01); *B60H 1/2226* (2019.05);
(Continued)

(58) Field of Classification Search
CPC ................................. H05B 3/03; B60H 1/2226
See application file for complete search history.

(56) References Cited

U.S. PATENT DOCUMENTS

2002/0083777 A1*  7/2002  Mochida ............. G01P 15/0802
                                                              73/818
2016/0039265 A1*  2/2016  Ota ......................... H05B 3/12
                                                              219/202
(Continued)

FOREIGN PATENT DOCUMENTS

DE         10029237 A1 * 12/2001   ......... B60H 1/00285
JP      2014189251 A     10/2014
(Continued)

OTHER PUBLICATIONS

WO-2016117376-A1 (Oide Hiroyasu) Jul. 28, 2016 [retrieved on 2024-14-24]. Retrieved from Espacenet Database, translation by EPO and Google. (Year: 2016).*
(Continued)

*Primary Examiner* — Ibrahime A Abraham
*Assistant Examiner* — Franklin Jefferson Wang
(74) *Attorney, Agent, or Firm* — Harness, Dickey & Pierce, P.L.C.

(57)  ABSTRACT

A heater device includes a heat generating part that generates heat by energization, and a detection unit. The detection unit detects whether or not a distance between an object around the heat generating part and the heat generating part is equal to or less than a first detection distance with a first detection sensitivity, and whether or not the distance between the object around the heat generating part and the heat generating part is equal to or less than a second detection distance shorter than the first detection distance with a second detection sensitivity that is less sensitive than the first detection sensitivity.

9 Claims, 7 Drawing Sheets

(52) U.S. Cl.
   CPC ............ *B60H 1/2227* (2019.05); *H05B 3/03* (2013.01); *H05B 2203/032* (2013.01)

(56) References Cited

U.S. PATENT DOCUMENTS

| | | |
|---|---|---|
| 2016/0046174 A1 | 2/2016 | Sagou et al. |
| 2016/0059669 A1 | 3/2016 | Sagou et al. |
| 2019/0050097 A1* | 2/2019 | Mugiraneza ............ G06F 3/0446 |
| 2019/0359032 A1 | 11/2019 | Sagou et al. |
| 2020/0196392 A1 | 6/2020 | Seki et al. |

FOREIGN PATENT DOCUMENTS

| | | | |
|---|---|---|---|
| JP | 2014208515 A | 11/2014 | |
| JP | 5954235 B2 | 7/2016 | |
| JP | 6288310 B2 | 3/2018 | |
| JP | 2019046786 A | 3/2019 | |
| JP | 2019184171 A | 10/2019 | |
| WO | WO-2016117376 A1 * | 7/2016 | ............... H05B 3/00 |

OTHER PUBLICATIONS

DE-10029237-A1 (Schwarzkopf Richard) Dec. 20, 2001 [retrieved on 2024-14-24]. Retrieved from InnovationQ, translation by InnovationQ. (Year: 2001).*

* cited by examiner

HEATER DEVICE

CROSS REFERENCE TO RELATED APPLICATION

This application is a continuation application of International Patent Application No. PCT/JP2020/010843 filed on Mar. 12, 2020, which designated the U.S. and based on and claims the benefits of priority of Japanese Patent Application No. 2019-058595 filed on Mar. 26, 2019. The entire disclosure of all of the above applications is incorporated herein by reference.

TECHNICAL FIELD

The present disclosure relates to a heater device.

BACKGROUND

A device has a heat generating part that generates heat when energized, a plurality of electrodes for detecting a change in capacitance due to an object around the heat generating part, a proximity detection unit for detecting a proximity of the object based on a change in capacitance between the plurality of electrodes, and an energization control unit for controlling energization to the heat generating part based on the proximity of the object detected by the proximity detection unit.

SUMMARY

An object of the present disclosure is to enable more accurate detection of the proximity of the object around the heat generating part even if the capacitance between electrodes changes due to the external factor.

According to one aspect of the present disclosure, the heater device includes a heat generating part that generates heat by energization, and a detection unit. The detection unit detects whether or not a distance between an object around the heat generating part and the heat generating part is equal to or less than a first detection distance with a first detection sensitivity, and whether or not the distance between the object around the heat generating part and the heat generating part is equal to or less than a second detection distance shorter than the first detection distance with a second detection sensitivity that is less sensitive than the first detection sensitivity.

A reference numeral in parentheses attached to each component or the like indicates an example of correspondence between the component or the like and specific component or the like described in an embodiments below.

DETAILED DESCRIPTION

In an assumable example, a device has a heat generating part that generates heat when energized, a plurality of electrodes for detecting a change in capacitance due to an object around the heat generating part, a proximity detection unit for detecting a proximity of the object based on a change in capacitance between the plurality of electrodes, and an energization control unit for controlling energization to the heat generating part based on the proximity of the object detected by the proximity detection unit.

In the device, the capacitance between a plurality of electrodes changes depending on the energization of the heat generating part. According to a study, it was found that the capacitance between the plurality of electrodes also changes due to the heat shrinkage of each electrode due to the heat generation of the heat generating part. Further, according to the study, if the capacitance between the electrodes changes due to such an external factor, the proximity of the object may not be detected.

An object of the present disclosure is to enable more accurate detection of the proximity of the object around the heat generating part even if the capacitance between electrodes changes due to the external factor.

According to one aspect of the present disclosure, the heater device includes a heat generating part that generates heat by energization, and a detection unit. The detection unit detects whether or not a distance between an object around the heat generating part and the heat generating part is equal to or less than a first detection distance with a first detection sensitivity, and whether or not the distance between the object around the heat generating part and the heat generating part is equal to or less than a second detection distance shorter than the first detection distance with a second detection sensitivity that is less sensitive than the first detection sensitivity.

Therefore, even if the capacitance between the electrodes changes due to an external factor, the proximity of the object around the heat generating part can be detected more accurately.

Hereinafter, embodiments will be described with reference to the drawings. In the respective embodiments described herein, identical or equivalent parts are given identical reference numerals in the figures.

First Embodiment

Figure 1:
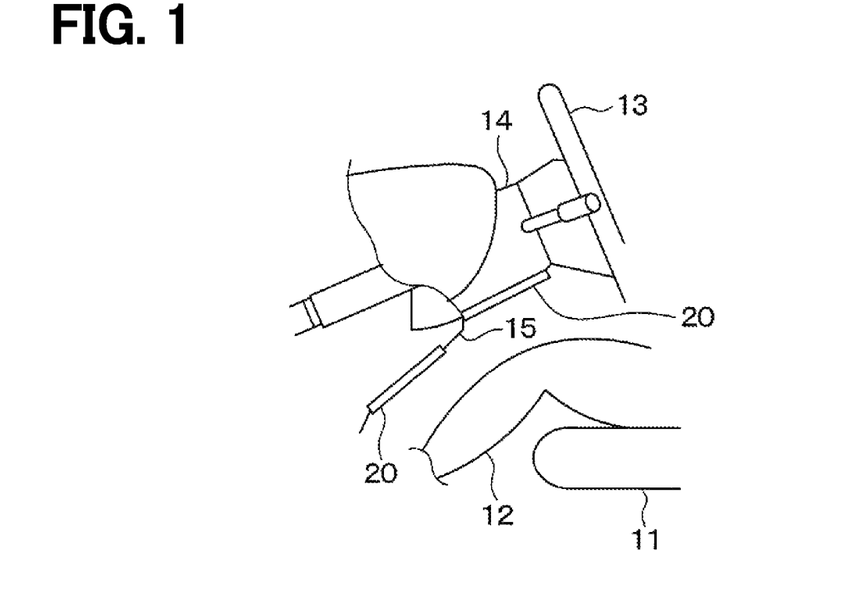
FIG. 1 is a diagram showing a mounting position of a heater device according to a first embodiment.
Figure 2:
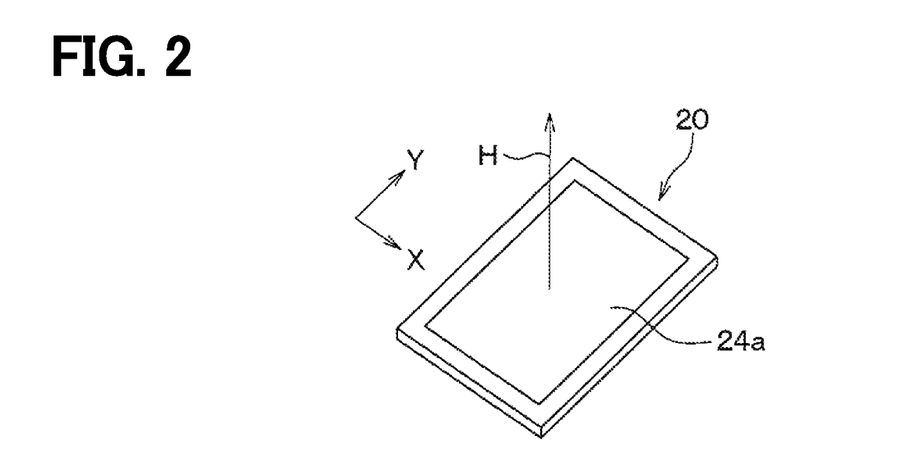
FIG. 2 is an external view of a heater device according to the first embodiment.

A heater device of a first embodiment will be described with reference to FIGS. 1 to 8. As shown in FIG. 1, a heater device 20 is installed in an interior of a moving body such as a road traveling vehicle. The heater device 20 constitutes a part of the heating device for the interior. The heater device 20 is an electric heater that is supplied with a power from a power supply such as a battery and a generator mounted on the moving body to generate heat. The heater device 20 has a thin plate-shape. The heater device 20 generates heat when power is supplied. As shown in FIG. 2, the heater device 20 has a heat generating surface 24a that radiates a radiant heat H primarily in a direction perpendicular to a surface of the heater device 20 to warm a target object positioned in the direction perpendicular to the surface. It can be called a plan heater.

A seat 11 on which an occupant 12 is seated is installed in the interior. The heater device 20 is installed in the interior to radiate the radiant heat H to feet of the occupant 12. The heater device 20 can be used for quickly providing warmth to the occupant 12 immediately after activating other heater devices, for example. The heater device 20 is installed on a wall surface of the interior. The heater device 20 is arranged to face the occupant 12 who is in an assumed normal posture. The road traveling vehicle has a steering column 13 for supporting a steering column 14. The heater device 20 is installed on a lower surface of the steering column 14 and a lower surface of an instrument panel cover 15 so as to face the occupant 12.

Figure 3:
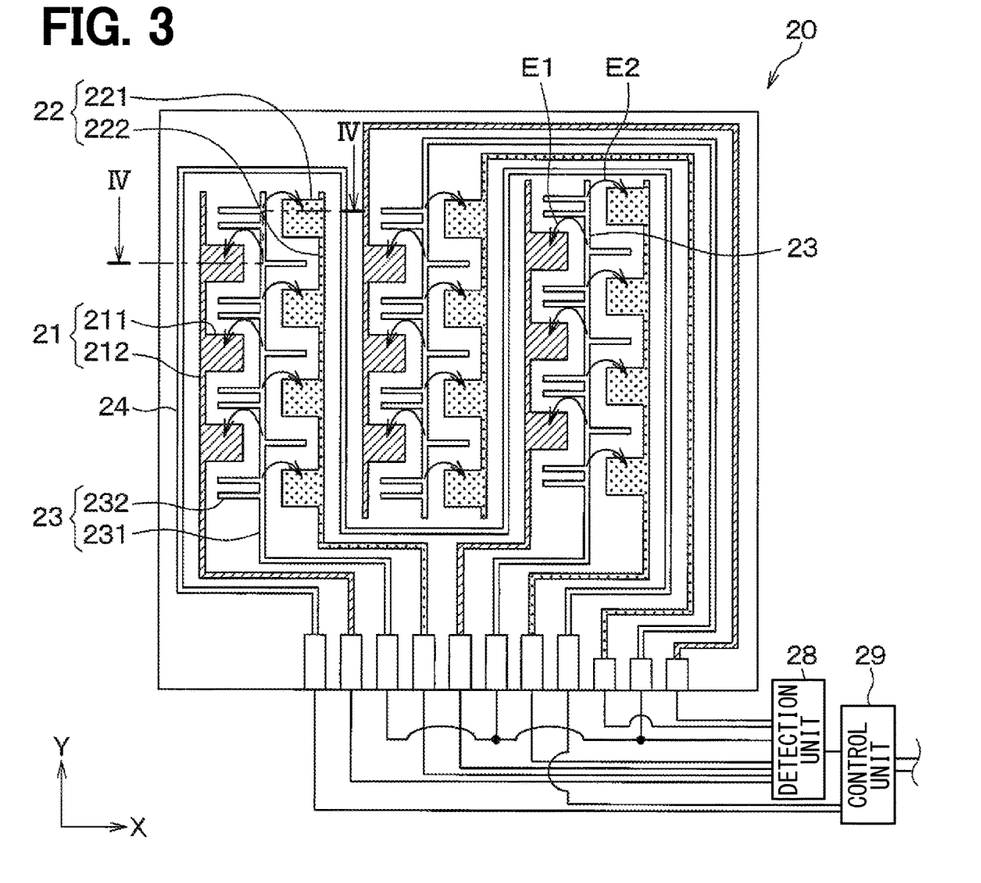
FIG. 3 is a diagram showing an overall configuration of a heater device according to the first embodiment, in which an insulating base member is omitted.
Figure 4:
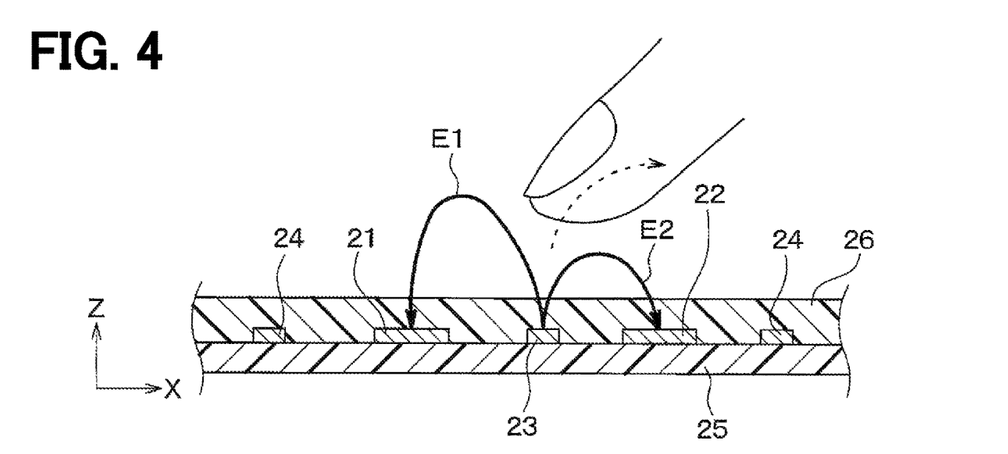
FIG. 4 is a sectional view taken along line IV-IV in FIG. 3.

Next, the configuration of the heater device 20 will be described. As shown in FIGS. 3 and 4, the heater device 20 includes a first receiving electrode 21, a second receiving electrode 22, a transmitting electrode 23, a heat generating part 24, an insulation base member 25, a cover member 26, a detection unit 28, and a control unit 29. In FIG. 3, the cover member 26 is omitted. Further, in FIG. 3, for clarity of illustration, the first receiving electrode 21 is shown by line hatching and the second receiving electrode 22 is shown by point hatching. Further, the insulation base member 25 corresponds to an insulation substrate.

The insulation substrate 25 is composed of a plate-shaped member extending along an XY plane defined by an axis X and an axis Y. The insulation substrate 25 has a thickness in the direction of an axis Z in the XY plane. The insulation substrate 25 is formed in a substantially quadrangular thin plate shape. The insulation substrate 25 is made of a resin material having high insulating properties and withstanding high temperatures, for example, a polyimide film. The first receiving electrode 21, the second receiving electrode 22, the transmitting electrode 23, and the heat generating part 24 are formed on the surface of the insulation substrate 25 on the occupant side.

The first receiving electrode 21, the second receiving electrode 22, the transmitting electrode 23, and the heat generating part 24 are made of a thin copper film, and the heater device 20 is made thinner and has a lower heat capacity. Further, by reducing the heat capacity, the temperature of the heat generating part 24 can be rapidly raised by energization. Further, when the object comes into contact with a heat generating surface 24a, the temperature of the contacted portion can be rapidly lowered. Further, the first receiving electrode 21, the second receiving electrode 22, and the transmitting electrode 23 are connected to the detection unit 28.

The first receiving electrode 21 has a plurality of plate-shaped portions 211 formed so as to expand in the XY plane direction, and a connecting portion 212 connecting between the plate-shaped portions 211. The plurality of plate-shaped portions 211 each have a rectangular shape, and the connecting portion 212 has a linear shape.

The second receiving electrode 22 has a plurality of plate-shaped portions 221 formed so as to expand in the XY plane direction, and a connecting portion 222 connecting between the plate-shaped portions 221. Each plate-shaped portion 221 has a rectangular shape, and the connecting portion 222 has a linear shape. Further, each plate-shaped portion 211 of the first receiving electrode 21 has the same shape and area as each plate-shaped portion 221 of the second receiving electrode 22.

The transmitting electrode 23 has a main wire portion 231 and a plurality of branch-shaped portions 232 that branch off from the main wire portion 231. The transmitting electrode 23 is arranged between the first receiving electrode 21 and the second receiving electrode 22 at a predetermined distance from the first receiving electrode 21 and the second receiving electrode 22.

In the heater device 20 of the present embodiment, two branch-shaped portions 232 of the transmitting electrode 23 are arranged between the plate-shaped portions 211 of the first receiving electrodes 21 arranged side by side in the Y-axis direction. Further, one branch-shaped portion 232 of the transmitting electrode 23 is arranged between the plate-shaped portions 221 of the second receiving electrodes 22 arranged side by side in the Y-axis direction.

As a result, a distance in the Y-axis direction between the plate-shaped portion 211 of the first receiving electrode 21 and the branch-shaped portion 232 of the transmitting electrode 23 is shorter than a distance in the Y-axis direction between the plate-shaped portion 221 of the second receiving electrode 22 and the branch-shaped portion 232 of the transmitting electrode 23.

Therefore, a capacitance formed between the transmitting electrode 23 and the first receiving electrode 21 becomes larger than a capacitance formed between the transmitting electrode 23 and the second receiving electrode 22. That is, an electric line of force E1 formed between the transmitting electrode 23 and the first receiving electrode 21 is larger than an electric line of force E2 formed between the transmitting electrode 23 and the second receiving electrode 22.

The detection unit 28 of the present embodiment amplifies a signal corresponding to a change in capacitance between the transmitting electrode 23 and the first receiving electrode 21, and a signal corresponding to a change in capacitance between the transmitting electrode 23 and the second receiving electrode 22 by an amplifier. Further, the detection unit 28 detects whether or not the distance between the object around the heat generating part 24 and the heat generating part 24 is equal to or less than a first detection distance L1 with a first detection sensitivity. Further, the detection unit 28 determines whether or not the distance between the object around the heat generating part 24 and the heat generating part 24 is equal to or less than a second detection distance L2 with a second detection sensitivity lower than the first detection sensitivity.

The detection unit 28 outputs a signal indicating whether or not the distance between the object and the heat generating part 24 is equal to or less than the first detection distance L1 and a signal indicating whether or not the distance between the object and the heat generating part 24 is equal to or greater than the second detection distance L2, to the control unit 29.

The heat generating part 24 is linear and is formed so as to meander on one surface of the insulation substrate 25. The heat generating part 24 radiates radiant heat H that makes the occupant 12 feel warm by energizing by the control unit 29. The heat generating part 24 is made of a material having a high thermal conductivity. For example, the heat generating part 24 may be made of copper, alloy of copper and tin (Cu—Sn), a metal such as silver, tin, stainless steel, nickel, and nichrome, or alloy including at least one of silver, tin, stainless steel, nickel or nichrome.

The cover member 26 protects the first receiving electrode 21, the second receiving electrode 22, the transmitting electrode 23, and the heat generating part 24. The cover member 26 is composed of a low thermal conductive member having a lower thermal conductivity than the first receiving electrode 21, the second receiving electrode 22, the transmitting electrode 23, and the heat generating part 24.

The control unit 29 is configured as a computer equipped with a CPU, a memory, an I/O, and the like, and the CPU executes various processes according to a program stored in the memory. The memory is a non-transitory tangible storage medium.

The heater device 20 of the present embodiment is configured as a mutual capacitive sensor. Next, an operation principle of the mutual capacitive sensor will be described with reference to FIGS. 5 and 6. Here, it will be described as the capacitive sensor having the transmitting electrode 23 and the first receiving electrode 21.

Figure 5:
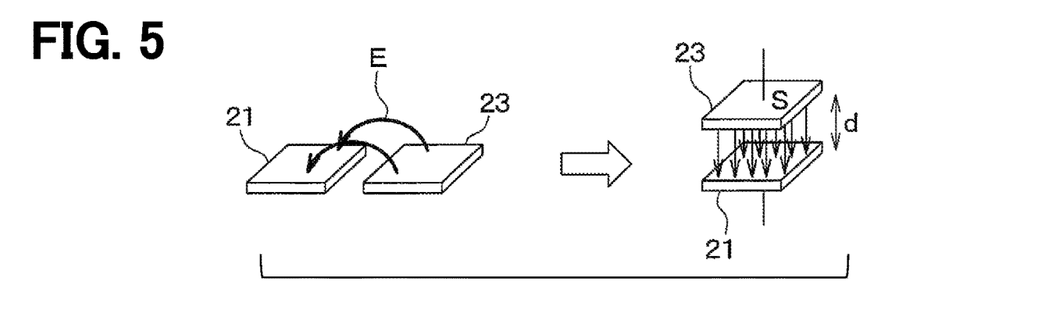
FIG. 5 is a diagram for explaining an operating principle of a mutual capacitive sensor.

A schematic diagram of the transmitting electrode 23 and the first receiving electrode 21 is illustrated on the left side in FIG. 5, and an equivalent circuit of the transmitting electrode 23 and the first receiving electrode 21 is illustrated on the right side in FIG. 5.

As shown on the left side in FIG. 5, the transmitting electrode 23 and the first receiving electrode 21 are adjacent to each other in the mutual capacitive sensor. An electric field is created between the transmitting electrode 23 and the first receiving electrode 21 when voltage is applied between the transmitting electrode 23 and the first receiving electrode 21.

A capacitance C between the transmitting electrode 23 and the first receiving electrode 21 can be expressed as in Equation 1, where ε is a permittivity between the transmitting electrode 23 and the first receiving electrode 21, S is an area of one electrode, and d is a distance between the electrodes.

$$c = \frac{\varepsilon \cdot S}{d} \quad \text{[Equation 1]}$$

Figure 6:
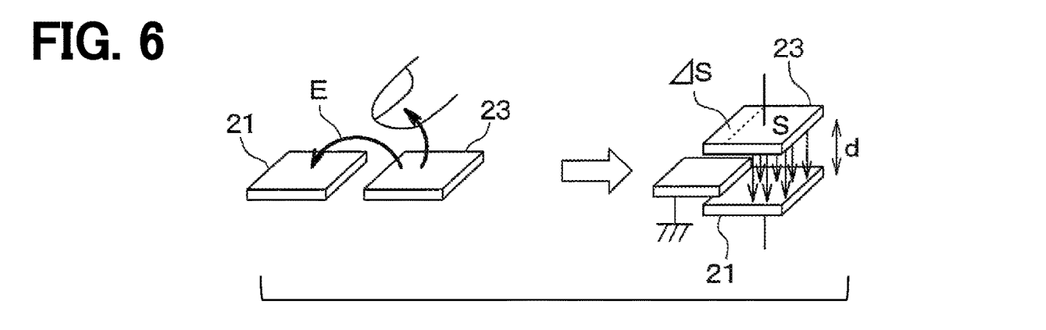
FIG. 6 is a diagram for explaining an operating principle of a mutual capacitive sensor.

When a finger that is a part of a human body approaches as an object around the electrode, a part of the field line E is absorbed by the finger as shown on the left side in FIG. 6, and accordingly the electric field received by the first receiving electrode 21 decreases. As shown on the right side in FIG. 5, this situation can be regarded as same to a situation where a grounded object is inserted between the transmitting electrode 23 and the first receiving electrode 21.

In this case, the capacitance C between the transmitting electrode 23 and the first receiving electrode 21 can be expressed as in Equation 2, where ΔS is an area of the grounded object overlapping the electrodes.

$$c' = \frac{\varepsilon \cdot (S - \Delta S)}{d} \quad \text{[Equation 2]}$$

That is, the contiguity of the finger can be detected by determining the difference between the capacitance C expressed in the equation 1 and the capacitance C' expressed in the equation 2.

As described above, the detection unit 28 detects whether or not the distance between the object around the heat generating part 24 and the heat generating part 24 is equal to or less than a first detection distance L1 with a first detection sensitivity. Further, the detection unit 28 determines whether or not the distance between the object around the heat generating part 24 and the heat generating part 24 is equal to or less than a second detection distance L2 with a second detection sensitivity lower than the first detection sensitivity.

Figure 7:
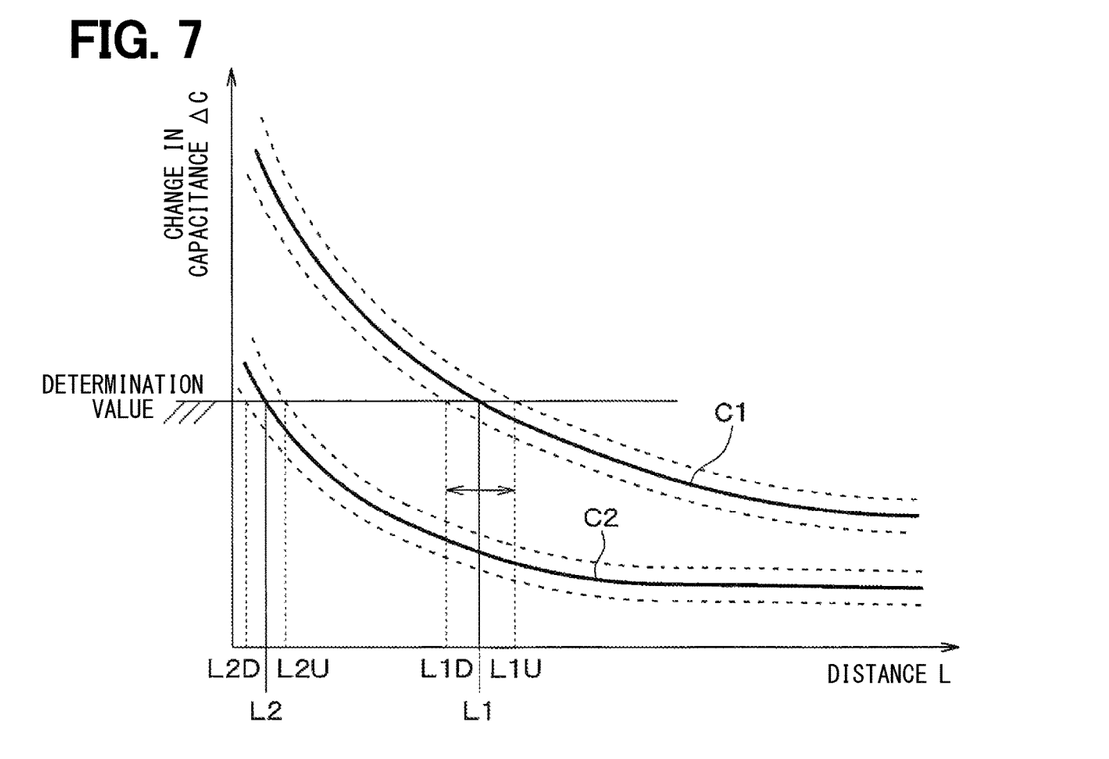
FIG. 7 is a diagram showing a relationship between a distance to an object and a change in capacitance based on a determination value.

FIG. 7 shows a relationship of change C1 in capacitance between the first receiving electrode 21 and the transmitting electrode 23 with respect to the distance L from the object in the heater device 20 of the present embodiment, and a relationship of change C2 in capacitance between the second receiving electrode 22 and the transmitting electrode 23 with respect to the distance L from the object in the heater device 20 of the present embodiment.

As the distance L from the object becomes shorter, the changes C1 and C2 of each capacitance become larger. Further, the change C1 in the capacitance between the first receiving electrode 21 and the transmitting electrode 23 is configured to be larger than the change C2 in the capacitance between the second receiving electrode 22 and the transmitting electrode 23.

Here, as shown by the dotted line in FIG. 7, the change C1 in capacitance between the second receiving electrode 22 and the transmitting electrode 23 and the change C2 in capacitance between the second receiving electrode 22 and the transmitting electrode 23 change depending on an external factor such as temperature in the operating temperature environment. Here, the operating temperature environment means, for example, an environment of −10° C. to 120° C.

In the heater device 20 of the present embodiment, a lower limit value of the change in capacitance C1 between the first receiving electrode 21 and the transmitting electrode 23 is configured to be larger than an upper limit value of the change C2 in capacitance between the second receiving electrode 22 and the transmitting electrode 23.

Further, in the heater device 20 of the present embodiment, the lower limit value L1D of the first detection distance L1 under the operating temperature environment is larger than the upper limit value L2U of the second detection distance L2 under the operating temperature environment.

Therefore, the lower limit value of the first detection distance under the operating temperature environment is not smaller than the upper limit value of the second detection distance under the operating temperature environment, and the proximity of the object is detected with high accuracy.

Figure 8:
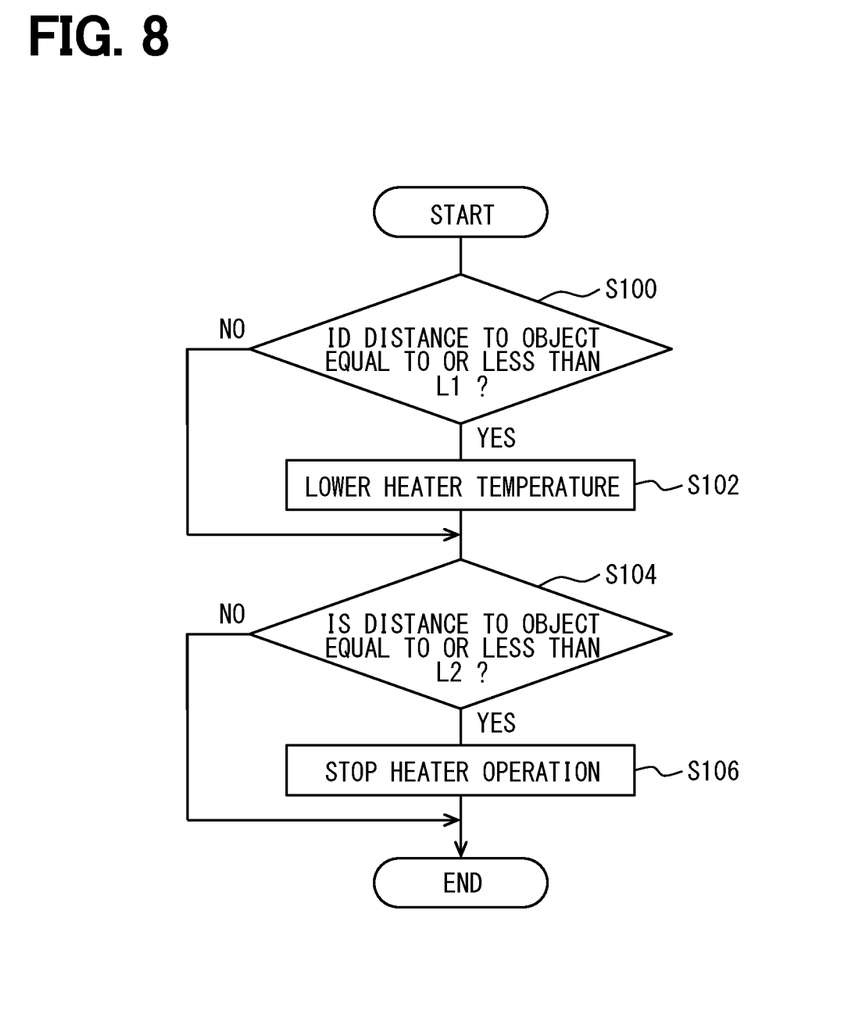
FIG. 8 is a flowchart in a control unit.

Next, a processing of the control unit 29 will be described with reference to the flowchart of FIG. 8. This processing starts as soon as the heater device 20 is turned on. When the power of the heater device 20 is turned on, the control unit 29 energizes the heat generating part 24. As a result, the heat generating part 24 generates heat. Further, the detection unit 28 applies a predetermined voltage to the heat generation part 24.

First, the control unit 29 determines in S100 whether or not the distance between the object around the heat generating part 24 and the heat generating part 24 is equal to or less than the first detection distance L1. Specifically, it is determined whether or not the distance between the object and the heat generating unit 24 is equal to or less than the first detection distance L1 based on an output signal of the detection unit 28.

Here, when it is determined in S100 that the distance between the object around the heat generating part 24 and the heat generating part 24 is not equal to or less than the first detection distance L1, the control unit 29 determines in S104 whether or not the distance between the object and the heat generating part 24 is equal to or less than the second detection distance L2. Specifically, it is determined whether or not the distance between the object and the heat generating part 24 is equal to or less than the second detection distance L2 based on the output signal of the detection unit 28. Then, when it is determined that the distance between the object and the heat generating part 24 is not equal to or less than the second detection distance L2, the control unit 29 ends this process. Therefore, the energization of the heat generating part 24 is continued.

Further, when it is determined in S100 that the distance between the object and the heat generating part 24 is equal to or less than the first detection distance L1, in S102, the control unit 29 lowers the heater temperature of the heat generating part 24 to the first temperature. As a result, the temperature of the heat generating part 24 is lowered.

Next, the control unit 29 determines in S104 whether or not the distance between the object and the heat generating part 24 is equal to or less than the second detection distance L2. Specifically, it is determined whether or not the distance between the object and the heat generating part 24 is equal to or less than the second detection distance L2 based on the output signal of the detection unit 28.

Here, when the distance between the object and the heat generating part 24 is equal to or less than the second detection distance L2, the control unit 29 stops the energization of the heat generating part 24 and stops the operation of the heat generating part 24 in S106. As a result, the temperature of the heat generating part 24 is further lowered, and the thermal discomfort to the occupant can be reduced.

As described above, the heater device 20 of the present embodiment includes the heat generating part 24 that generates heat when energized. Further, the detection unit 28 detects whether or not the distance between the object and the heat generating part 24 is equal to or less than the first detection distance L1 with the first detection sensitivity, and whether or not the distance between the object and the heat generating part 24 is equal to or less than the second detection distance L2 being shorter than the first detection distance L1 with the second detection sensitivity which is lower than the first detection sensitivity.

Therefore, even if the capacitance between the electrodes changes due to an external factor, the proximity of the object around the heat generating part can be detected more accurately.

Further, when the detection unit 28 detects that the distance between the object around the heat generating part 24 and the heat generating part 24 is equal to or less than the first detection distance L1, the heater device 20 has a first temperature lowering portion (S102) that sets the heater temperature of the heat generating part 24 to a first temperature. Further, when the detection unit 28 detects that the distance between the object around the heat generating part 24 and the heat generating part 24 is equal to or less than the second detection distance L2, the heater device 20 has a second temperature lowering portion (S106) that stops energization of the heat generating part 24. Therefore, the thermal discomfort to the occupant can be reduced.

Further, the lower limit value L1D of the first detection distance L1 under the operating temperature environment is larger than the upper limit value L2U of the second detection distance L2 under the operating temperature environment. Therefore, the lower limit value L1D of the first detection distance L1 under the operating temperature environment is not smaller than the upper limit value L2U of the second detection distance L2 under the operating temperature environment, and the proximity of the object can be detected accurately.

Further, the heater device 20 includes the receiving electrodes 21 and 22 and the transmitting electrodes 23. Then, the detection unit 28 detects whether or not the distance between the object and the heat generating part 24 is equal to or less than the first detection distance L1 based on the change in capacitance between the receiving electrodes 21 and 22 and the transmitting electrode 23. Further, the detection unit 28 detects whether or not the distance between the object around the heat generating part 24 and the heat generating part 24 is equal to or less than the second detection distance L2 based on the change in capacitance between the receiving electrodes 21 and 22 and the transmitting electrode 23.

In this way, the distance between the object and the heat generating part 24 can be detected based on the change in capacitance between the receiving electrodes 21 and 22 and the transmitting electrode 23.

Further, the insulation substrate 25 on which the heat generating part 24, the receiving electrodes 21, 22 and the transmitting electrode 23 are formed is provided, and the heat generating part 24, the receiving electrodes 21, 22 and the transmitting electrode 23 are formed on the same surface of the insulation substrate 25. Therefore, the structure can be simplified and the manufacturing cost can be reduced.

Further, the receiving electrodes 21 and 22 have a first receiving electrode 21 and a second receiving electrode 22 respectively. The detection unit 28 detects whether or not the distance between the object around the heat generating part 24 and the heat generating part 24 is equal to or less than the first detection distance L1 based on the change in capacitance between the first receiving electrode 21 and the transmitting electrode 23. Then, the detection unit 28 detects whether or not the distance between the object around the heat generating part 24 and the heat generating part 24 is equal to or less than the second detection distance L2 based on the change in capacitance between the second receiving electrode 22 and the transmitting electrode 23.

According to this configuration, since the transmitting electrode 23 also serves as the transmitting electrode of the first receiving electrode 21 and the transmitting electrode of the second receiving electrode 22, wiring can be greatly simplified.

Further, the heat generating part 24 is formed so as to meander, and the first receiving electrode 21, the second receiving electrode 22, and the transmitting electrode 23 are arranged side by side between the heat generating parts 24.

Therefore, since the first receiving electrode 21, the second receiving electrode 22, and the transmitting electrode 23 are arranged alongside the heat generating part 24, the distance between the object around the heat generating part 24 and the heat generating part 24 can be detected accurately.

Further, the capacitance formed between the transmitting electrode 23 and the first receiving electrode 21 becomes larger than the capacitance formed between the transmitting electrode 23 and the second receiving electrode 22. The first detection sensitivity is higher than the second detection sensitivity.

In this way, the capacitance formed between the transmitting electrode 23 and the first receiving electrode 21 is made larger than the capacitance formed between the transmitting electrode 23 and the second receiving electrode 22.

Therefore, the first detection sensitivity can be made higher than the second detection sensitivity.

In the present embodiment, when the distance between the object and the heat generating part 24 is equal to or less than the second detection distance L2, the control unit 29 stops the operation of the heat generating part 24 in S106. On the other hand, when the distance between the object and the heat generating part 24 is equal to or less than the second detection distance L2, the control unit 29 may lower the temperature of the heat generating part 24 to a second temperature lower than the first temperature in S106.

Second Embodiment

Figure 9:
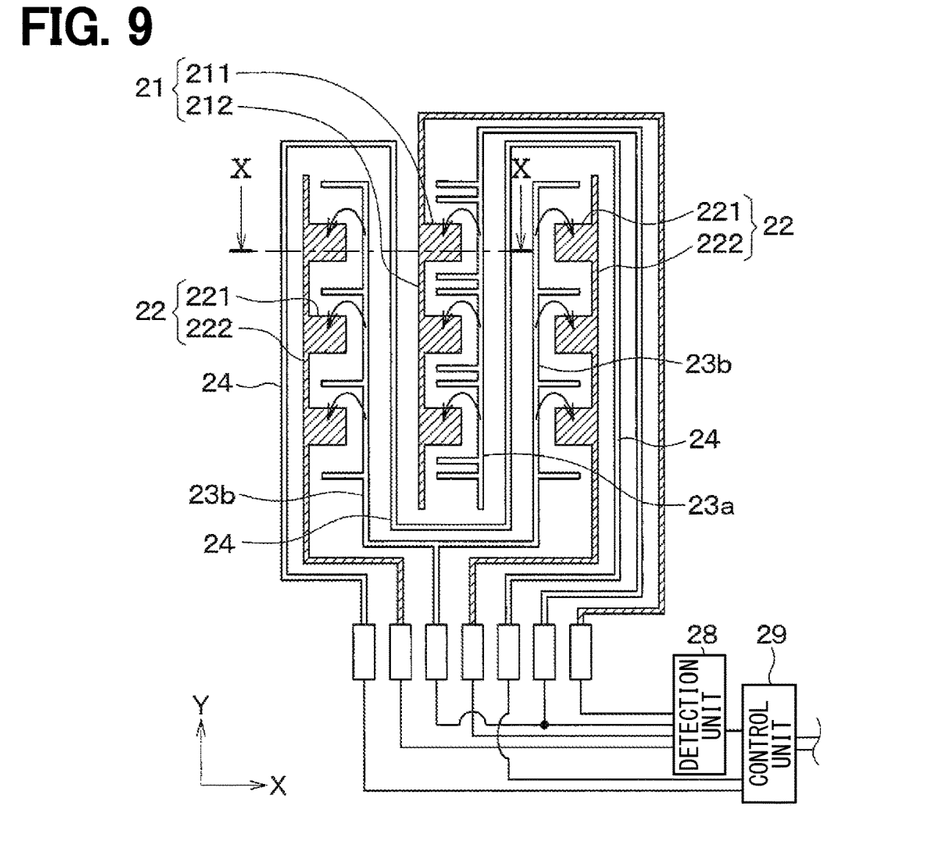
FIG. 9 is a diagram showing an overall configuration of a heater device according to a second embodiment, in which an insulating base member is omitted.
Figure 10:
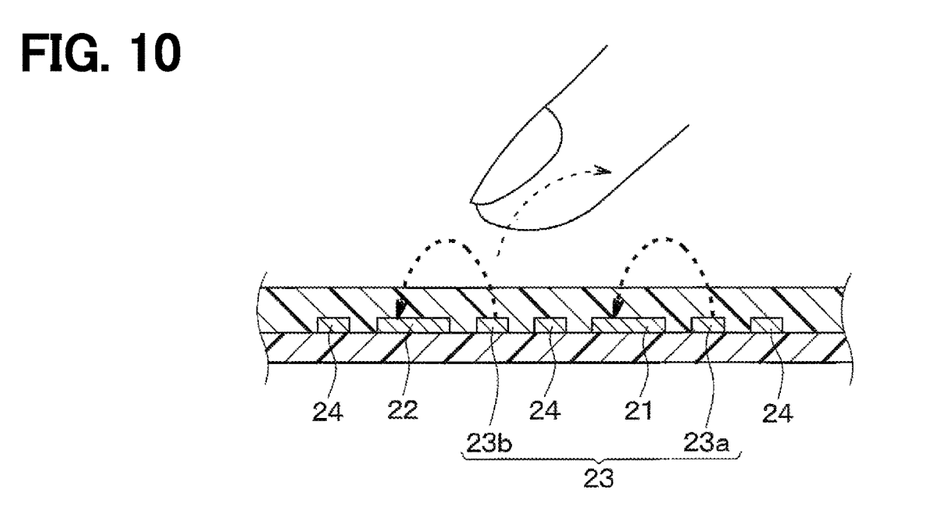
FIG. 10 is a cross-sectional view taken along the line X-X in FIG. 9.

A heater device 20 according to a second embodiment will be described with reference to FIGS. 9 to 10. The heater device 20 of the first embodiment has the first receiving electrode 21, the second receiving electrode 22, and the transmitting electrode 23 as electrodes. On the other hand, the heater device 20 of the present embodiment has the first receiving electrode 21, the second receiving electrode 22, a first transmitting electrode 23a, and a second transmitting electrode 23b as electrodes.

The detection unit 28 detects whether or not the distance between the object around the heat generating part 24 and the heat generating part 24 is equal to or less than the first detection distance L1 based on the change in capacitance between the first receiving electrode 21 and the first transmitting electrode 23a. Then, the detection unit 28 detects whether or not the distance between the object around the heat generating part 24 and the heat generating part 24 is equal to or less than the second detection distance L2 based on the change in capacitance between the second receiving electrode 22 and the second transmitting electrode 23b.

As described above, the detection unit 28 detects whether or not the distance between the object around the heat generating part 24 and the heat generating part 24 is equal to or less than the first detection distance L1 based on the change in capacitance between the first receiving electrode 21 and the first transmitting electrode 23a. Then, the detection unit 28 detects whether or not the distance between the object around the heat generating part 24 and the heat generating part 24 is equal to or less than the second detection distance L2 based on the change in capacitance between the second receiving electrode 22 and the second transmitting electrode 23b.

The present embodiment can achieve the effects and advantages, which are obtained from the structure common to the first embodiment.

Third Embodiment

Figure 11:
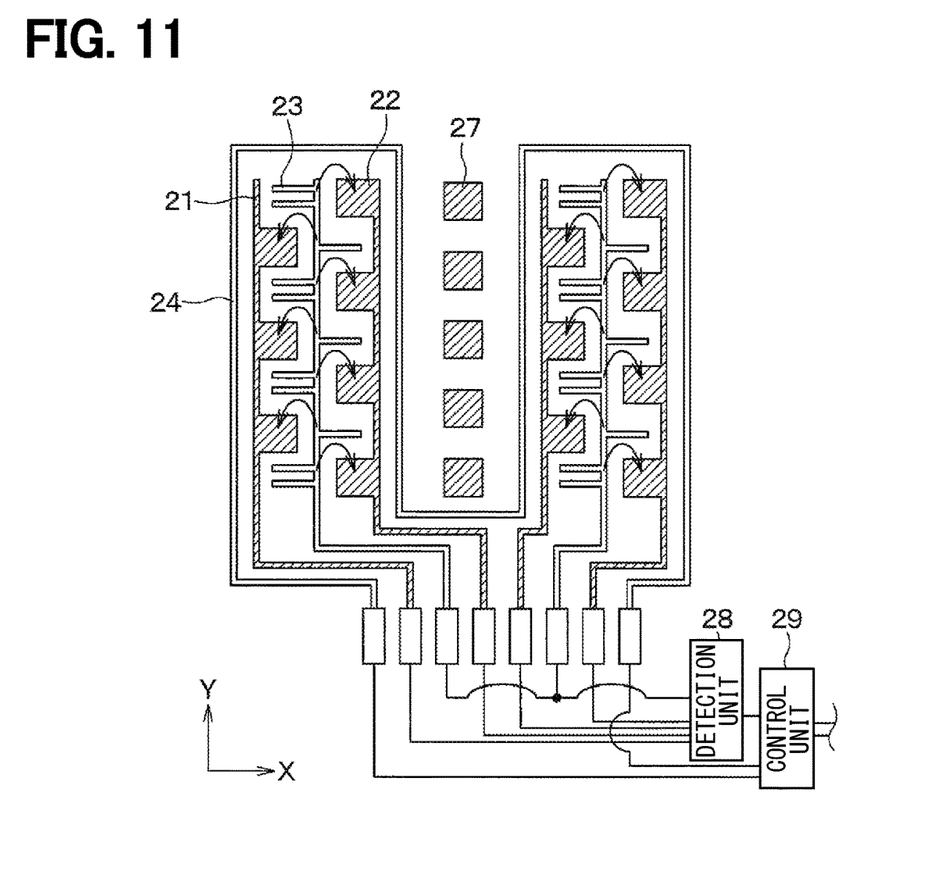
FIG. 11 is a diagram showing an overall configuration of a heater device according to a third embodiment, in which an insulating base member is omitted.

A heater device according to a third embodiment is described with reference to FIG. 11. In the heater device 20 of the present embodiment, a heat radiating plate 27 is formed on the same surface as the surface on which the first receiving electrode 21, the second receiving electrode 22, the transmitting electrode 23, and the heat generating part 24 are formed on the insulation substrate 25. The heat radiating plate 27 is made of the same thin copper film as the first receiving electrode 21, the second receiving electrode 22, the transmitting electrode 23, and the heat generating part 24. The heat radiating plate 27 can promote heat dissipation from the heat generating part 24.

The present embodiment can achieve the effects and advantages, which are obtained from the structure common to the first embodiment.

Fourth Embodiment

Figure 12:
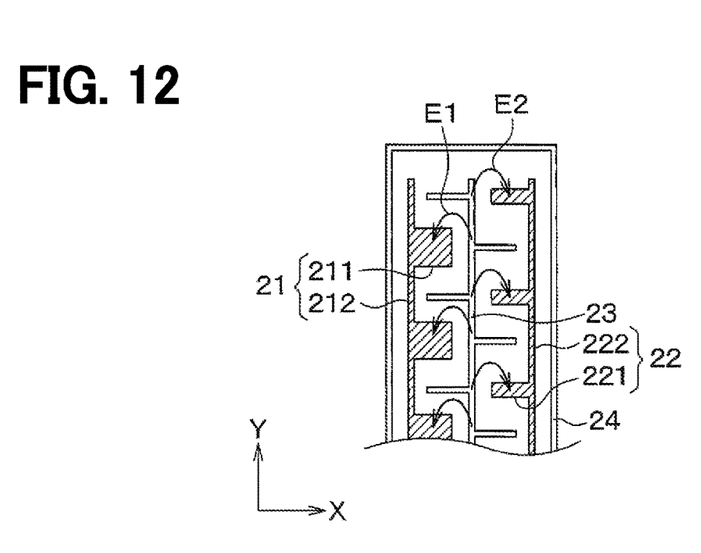
FIG. 12 is a diagram showing a modified example of the heater device.

The heater device 20 according to a fourth embodiment will be described with reference to FIG. 12. In the heater device 20 of the first embodiment, as shown in FIG. 3, the distance in the Y direction between the plate-shaped portion 211 of the first receiving electrode 21 and the branch-shaped portion 232 of the transmitting electrode 23 is the second is shorter than the distance in the Y direction between the plate-shaped portion 221 of the second receiving electrode 22 and the branch-shaped portion 232 of the transmitting electrode 23. Therefore, a capacitance formed between the transmitting electrode 23 and the first receiving electrode 21 becomes larger than a capacitance formed between the transmitting electrode 23 and the second receiving electrode 22.

On the other hand, in the heater device 20 of the present embodiment, the area of the plate-shaped portion 211 of the first receiving electrode 21 is larger than the area of the plate-shaped portion 221 of the second receiving electrode 22. Therefore, a capacitance formed between the transmitting electrode 23 and the first receiving electrode 21 becomes larger than a capacitance formed between the transmitting electrode 23 and the second receiving electrode 22.

The capacitance formed between the transmitting electrode 23 and the first receiving electrode 21 becomes larger than the capacitance formed between the transmitting electrode 23 and the second receiving electrode 22. The first detection sensitivity is higher than the second detection sensitivity.

The present embodiment can achieve the effects and advantages, which are obtained from the structure common to the first embodiment.

Other Embodiments (1) In the above embodiment, the heater device arranged in the vehicle interior of the moving body has been described, but it can be applied to various devices arranged outside the vehicle interior of the moving body.

(2) In the first embodiment, the distance in the Y direction between the plate-shaped portion 211 of the first receiving electrode 21 and the branch-shaped portion 232 of the transmitting electrode 23 is set to be shorter than the distance in the Y direction between the plate-shaped portion 221 of the second receiving electrode 22 and the branch-shaped portion 232 of the transmitting electrode 23. Therefore, the capacitance formed between the transmitting electrode 23 and the first receiving electrode 21 becomes larger than the capacitance formed between the transmitting electrode 23 and the second receiving electrode 22.

On the other hand, the capacitance formed between the transmitting electrode 23 and the first receiving electrode 21 can be considered to be larger than the capacitance formed between the transmitting electrode 23 and the second receiving electrode 22 by making a gain of the amplifier of the detection unit 28. In this way, the distance between the object around the heat generating part 24 and the heat generating part 24 may be detected with different detection sensitivities.

(3) In each of the above embodiments, the control unit 29 controls the temperature of the heat generating part 24 according to the output signal of the detection unit 28. On the other hand, the control unit 29 does not control the temperature of the heat generating part 24 according to the output signal of the detection unit 28, the control unit 29 can be configured as a device that outputs the output signal of the detection unit 28.

Figure 13:
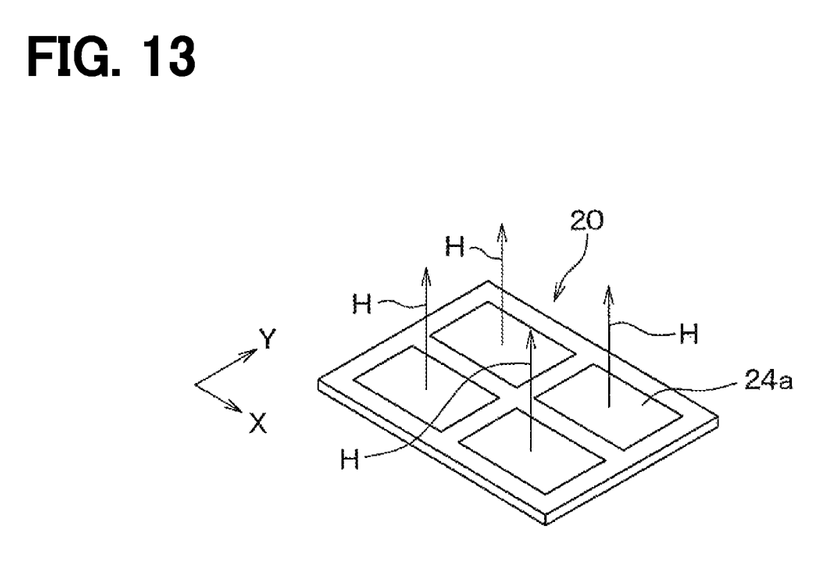
FIG. 13 is a diagram showing a modified example of the heater device.

(4) In each of the above embodiments, one heat generating surface 24*a* is formed on one insulation substrate 25, but as shown in FIG. 13, it is also possible to disperse and form a plurality of heat generating surfaces 24*a* on one insulation substrate 25. That is, the heater device has a plurality of heat generating surfaces 24*a* that radiate radiant heat by the heat generated by the heat generating part 24, and the plurality of heat generating surfaces 24*a* can be dispersedly arranged on the insulation substrate 25.

The present disclosure is not limited to the above-described embodiments, and can be appropriately modified. The embodiments described above are not independent of each other, and can be appropriately combined except when the combination is obviously impossible. The constituent element(s) of each of the above embodiments is/are not necessarily essential unless it is specifically stated that the constituent element(s) is/are essential in the above embodiment, or unless the constituent element(s) is/are obviously essential in principle. Furthermore, in each of the above embodiments, in the case where the number of the constituent element(s), the value, the amount, the range, and/or the like is specified, the present disclosure is not necessarily limited to the number of the constituent element(s), the value, the amount, and/or the like specified in the embodiment unless the number of the constituent element(s), the value, the amount, and/or the like is indicated as indispensable or is obviously indispensable in view of the principle of the present disclosure. Furthermore, a material, a shape, a positional relationship, or the like, if specified in the above-described example embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

Overview

According to the first aspect shown in part or all of the above embodiments, the heater device includes a heat generating part that generates heat when energized. The detection unit detects whether or not a distance between a object around the heat generating part and the heat generating part is equal to or less than a first detection distance with a first detection sensitivity, and whether or not the distance between the object around the heat generating part and the heat generating part is equal to or less than a second detection distance shorter than the first detection distance with a second detection sensitivity that is less sensitive than the first detection sensitivity.

Further, according to the second viewpoint, when the detection unit detects that the distance between the object around the heat generating part and the heat generating part is equal to or less than the first detection distance, the heater device 20 has a first temperature lowering portion that sets the heater temperature of the heat generating part to a first temperature. Further, when the detection unit detects that the distance between the object around the heat generating part and the heat generating part is equal to or less than the second detection distance, the heater device has a second temperature lowering portion that sets the heater temperature of the heat generating part to a second temperature lower than the first temperature. Therefore, the thermal discomfort to the occupant can be reduced.

Further, according to the third viewpoint, when the detection unit detects that the distance between the object around the heat generating part and the heat generating part is equal to or less than the second detection distance, the second temperature lowering portion stops the energization to the heat generating part. Therefore, the thermal discomfort to the occupant can be reduced.

Further, according to the fourth viewpoint, the lower limit value of the first detection distance under the operating temperature environment is larger than the upper limit value of the second detection distance under the operating temperature environment.

Therefore, the lower limit value of the first detection distance under the operating temperature environment is not smaller than the upper limit value of the second detection distance under the operating temperature environment, and the proximity of the object can be detected accurately.

Further, according to the fifth aspect, the heater device includes the receiving electrode and the transmitting electrode. The detection part detects whether or not the distance between the object around the heat generating part and the heat generating part is equal to or less than the first detection distance based on the change in capacitance between the first receiving electrode and the transmitting electrode. Then, the detection unit detects whether or not the distance between the object around the heat generating part and the heat generating part is equal to or less than the second detection distance based on the change in capacitance between the second receiving electrode and the transmitting electrode.

As described above, the detection unit detects whether or not the distance between the object around the heat generating part and the heat generating part is equal to or less than the first detection distance based on the change in capacitance between the receiving electrode and the transmitting electrode. Further, it is possible to detect whether or not the distance between the object around the heat generating part and the heat generating part is equal to or less than the second detection distance based on the change in the capacitance between the receiving electrode and the transmitting electrode.

Further, according to the sixth aspect, the heater device includes the substrate on which the heat generating part, the receiving electrode, and the transmitting electrode are formed. The heat generating part, the receiving electrode, and the transmitting electrode are formed on the same surface of the substrate. Therefore, the structure can be simplified and the manufacturing cost can be reduced.

Further, according to the seventh aspect, the receiving electrode has the first receiving electrode and the second receiving electrode. The detection unit detects whether or not the distance between the object around the heat generating part and the heat generating part is equal to or less than the first detection distance based on the change in capacitance between the first receiving electrode and the transmitting electrode. Then, the detection unit detects whether or not the distance between the object around the heat generating part and the heat generating part is equal to or less than the second detection distance based on the change in capacitance between the second receiving electrode and the transmitting electrode.

According to this configuration, since the transmitting electrode also serves as the transmitting electrode of the first receiving electrode and the transmitting electrode of the second receiving electrode, wiring can be greatly simplified.

Further, according to the eighth viewpoint, the heat generating part is formed so as to meander, and the first receiving electrode, the second receiving electrode, and the transmitting electrode are arranged side by side between the heat generating parts.

Therefore, since the first receiving electrode, the second receiving electrode, and the transmitting electrode are arranged alongside the heat generating part, the distance between the object around the heat generating part and the heat generating part can be detected accurately.

Further, according to the ninth aspect, the capacitance formed between the transmitting electrode and the first receiving electrode is larger than the capacitance formed between the transmitting electrode and the second receiving electrode. As a result, the first detection sensitivity is higher than the second detection sensitivity.

In this way, the capacitance formed between the transmitting electrode and the first receiving electrode is made larger than the capacitance formed between the transmitting electrode and the second receiving electrode. Therefore, the first detection sensitivity can be made higher than the second detection sensitivity.

Further, according to the tenth viewpoint, it has a plurality of heat generating surfaces that radiate radiant heat by the heat generated by the heat generating part, and the plurality of heat generating surfaces are dispersedly arranged on the substrate.

As described above, the heater device has a plurality of heat generating surfaces that radiate radiant heat by the heat generated by the heat generating part, and the plurality of heat generating surfaces can be dispersedly arranged on the substrate.

The process of S102 corresponds to the first temperature lowering portion, and the process of S106 corresponds to the second temperature lowering portion.

What is claimed is:

1. A heater device, comprising:
   a heat generating part configured to generate heat when energized;
   a detection unit configured to detect whether or not a distance between an object around the heat generating part and the heat generating part is equal to or less than a lower limit value of a first detection distance with a first detection sensitivity, and whether or not the distance between the object around the heat generating part and the heat generating part is equal to or less than a lower limit value of a second detection distance shorter than the first detection distance with a second detection sensitivity that is less sensitive than the first detection sensitivity; and
   a substrate on which the heat generating part, a receiving electrode, and a transmitting electrode are formed, wherein
   the heat generating part, the receiving electrode, and the transmitting electrode are formed on the same surface of the substrate,
   the transmitting electrode has a main wire portion and a plurality of branch-shaped portions that branch out and extend from the main wire portion,
   the transmitting electrode is disposed between a first receiving electrode and a second receiving electrode with a predetermined distance therebetween, and
   a distance between a plate-shaped portion of the first receiving electrode and a branch-shaped portion of the transmitting electrode facing the plate-shaped portion is shorter than a distance between a plate-shaped portion of the second receiving electrode and the branch-shaped portion of the transmitting electrode facing the plate-shaped portion.

2. The heater device according to claim 1, further comprising,
   a first temperature lowering portion configured to lower a heater temperature of the heat generating part to a first temperature, when the detection unit detects that a distance between the object around the heat generating part and the heat generating part is equal to or less than the first detection distance, and
   a second temperature lowering portion configured to lower the heater temperature of the heat generating part to a second temperature lower than the first temperature, when the detection unit detects that a distance between the object around the heat generating part and the heat generating part is equal to or less than the second detection distance.

3. The heater device according to claim 2, wherein
   the second temperature lowering portion stops energizing of the heat generating part, when the detection unit detects that the distance between the object around the heat generating part and the heat generating part is equal to or less than the second detection distance.

4. The heater device according to claim 1, wherein
   the lower limit value of the first detection distance under an operating temperature environment is larger than an upper limit value of the second detection distance under the operating temperature environment.

5. The heater device according to claim 1,
   wherein
   the detection unit detects whether or not the distance between the object around the heat generating part and the heat generating part is equal to or less than the first detection distance based on a change in capacitance between the receiving electrode and the transmitting electrode, and whether or not the distance between the object around the heat generating part and the heat generating part is equal to or less than the second detection distance based on the change in capacitance between the receiving electrode and the transmitting electrode.

6. The heater device according to claim 5, wherein
   the receiving electrode includes the first receiving electrode and the second receiving electrode, and
   the detection unit detects whether or not the distance between the object around the heat generating part and the heat generating part is equal to or less than the first detection distance based on a change in capacitance between the first receiving electrode and the transmitting electrode, and whether or not the distance between the object around the heat generating part and the heat generating part is equal to or less than the second detection distance based on a change in capacitance between the second receiving electrode and the transmitting electrode.

7. The heater device according to claim 6, wherein
   the heat generating part is formed so as to meander, and the first receiving electrode, the second receiving electrode, and the transmitting electrode are arranged between the heat generating part.

8. The heater device according to claim 6, wherein
   a capacitance formed between the transmitting electrode and the first receiving electrode is larger than a capacitance formed between the transmitting electrode and the second receiving electrode so that the first detection sensitivity is higher than the second detection sensitivity.

9. The heater device according to claim 1, further comprising,
a plurality of heat generating surfaces that radiate radiant heat by the heat generated by the heat generating part, wherein
the plurality of heat generating surfaces are dispersedly arranged on the substrate.

* * * * *